UNITED STATES PATENT OFFICE.

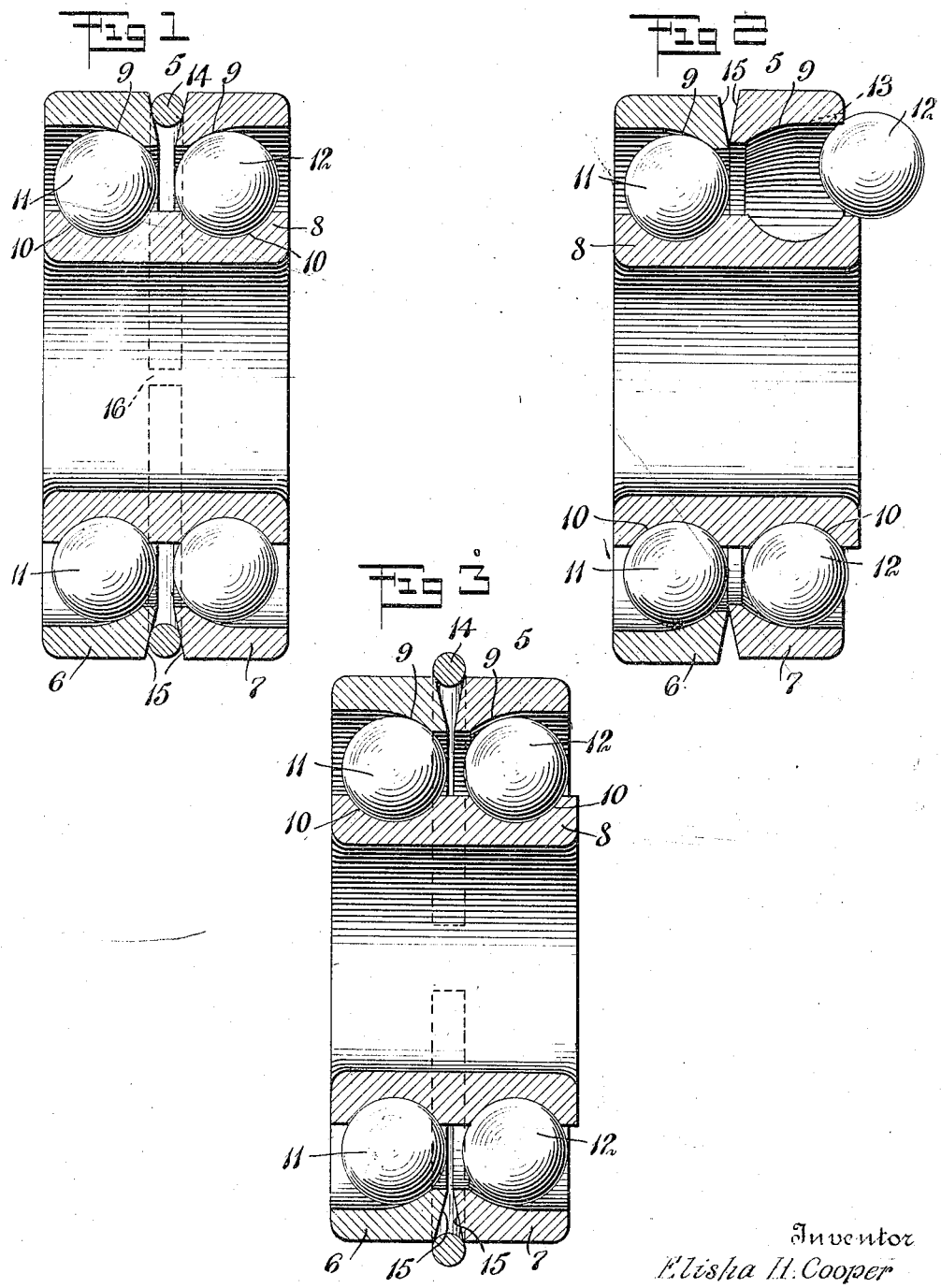

ELISHA H. COOPER, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-BEARING.

1,250,805.    Specification of Letters Patent.    Patented Dec. 18, 1917.

Application filed September 28, 1916. Serial No. 122,643.

*To all whom it may concern:*

Be it known that I, ELISHA H. COOPER, a citizen of the United States of America, residing at New Britain, Connecticut, have invented a new and useful Ball-Bearing, of which the following is a specification.

My present invention has for its general objects to provide a ball bearing of simple and inexpensive construction having advantages as to assemblage, durability, strength and wearing qualities.

Other objects are to provide a bearing which can be handled as a single unit and which will be practically self-adjusting to compensate for slight variations in the size of the parts, wear, etc.

With the foregoing and other objects in view I have devised a bearing in which one of the two coöperating members of the bearing is made up of parts which can be shifted toward each other for the purpose of opening up one of the race-ways for the insertion of the balls or other rolling elements, and hold said parts spaced in proper relation by a so-called spreading member engaged between opposed abutment faces on said parts and exerting a wedging action to force them apart to the proper extent.

The spreading member is preferably in the form of a split spring ring, and to secure the wedging action this ring may have inclined faces for engagement with the abutment faces of the two-part bearing member or said parts may have inclined faces or both the ring and said parts may have inclined wedging faces. A convenient method of providing the wedge faces on the spreading ring is to make it round in cross section, in which case the ring may be formed from ordinary spring wire stock.

Other features and details of construction will become apparent as the specification proceeds, attention being directed to the accompanying drawing wherein I have illustrated the invention embodied in a practical and preferred form.

In said drawing:

Figure 1 is a cross sectional view of the assembled bearing.

Fig. 2 is a similar view illustrating the axial shifting of the parts to open up the race-way for insertion of the balls therein.

Fig. 3 is a like view showing the raceways filled and the spreading ring about to be engaged between the parts to wedge them apart.

In the bearing illustrated, the outer bearing member 5 is made in two parts 6 and 7, and the inner bearing member 8 is made in a single part, said members having the opposed tracks 9 and 10 respectively, forming race-ways for the two rows of balls 11 and 12.

The parts 6 and 7 of the two-part bearing member are in the nature of rings which can be shifted axially toward each other as indicated in Fig. 2 to open up the second race-way for the insertion of the balls therein after the first race-way has been filled, a suitable filling notch 13 being provided if the axial movement is not in itself sufficient to open the race-way far enough to admit the balls.

After the race-ways have been properly filled, the parts of the two-part member are wedged apart and held properly spaced with the ball tracks thereon in proper engagement with the rows of balls by a spreading member shown in the illustration as a split spring ring 14 round in cross section to provide wedging surfaces at the sides thereof.

A further wedging effect is obtained in the present disclosure by making the opposed abutment faces 15 on the two parts 6 and 7 inclined to provide a wedge shaped slot in which the spring spreading ring seats.

With this construction the parts can be quickly assembled and any slight variation in size will be taken care of by the wedging action of the spreader, said spreader automaticallly forcing the parts into their proper relations and eliminating the necessity for adjustments of any kind. Also as the parts become worn the spring spreader will act continually by its spring action to force the rings farther apart and automatically compensate for such wear. To allow for this continued compensation, the spring ring is made with sufficient tension to exert itself as needed, and a space 16 is left in the construction shown between the ends of the split ring to permit of its further contraction. Also, once the spring ring is properly seated, there is no possibility of accidental separation of the parts.

What I claim is:—

1. A bearing comprising concentric bearing members provided with opposed tracks forming race-ways, one of said bearing members consisting of two opposed parts movable axially with respect to each other to open up one of the race-ways, said parts having opposed abutment faces, a split spring ring engaged between said opposed abutment faces, said ring and abutment faces having relatively inclined surfaces whereby to cause the ring in its spring action to wedge the parts away from each other and rolling elements in the race-ways aforesaid.

2. A bearing comprising concentric bearing members provided with opposed tracks forming race-ways, one of said bearing members consisting of two opposed parts movable axially with respect to each other to open up one of the race-ways, balls engaged in said race-ways and automatically operating wear compensating means interposed between the parts of the two-part bearing and holding said parts spaced with the ball tracks thereon in proper operating relation to the ball tracks on the opposed bearing member.

ELISHA H. COOPER.